United States Patent
Ducato et al.

(10) Patent No.: US 7,469,379 B2
(45) Date of Patent: Dec. 23, 2008

(54) METHOD, COMPUTER PROGRAM PRODUCT AND DEVICE TO PROCESS A DOCUMENT DATA STREAM

(75) Inventors: Jose La Rosa Ducato, Erding (DE); Joachim Horst, Erding (DE)

(73) Assignee: Oce Printing Systems GmbH, Poing (DE)

( * ) Notice: Subject to any disclaimer, the term of this patent is extended or adjusted under 35 U.S.C. 154(b) by 118 days.

(21) Appl. No.: 10/736,127

(22) Filed: Dec. 15, 2003

(65) Prior Publication Data

US 2004/0163052 A1 Aug. 19, 2004

(30) Foreign Application Priority Data

Dec. 20, 2002 (DE) ................. 102 60 135

(51) Int. Cl.
*G06F 17/00* (2006.01)
(52) U.S. Cl. ...................... 715/269; 345/471
(58) Field of Classification Search ........... 715/542, 715/500, 530, 269; 345/471, 467; 358/1.11
See application file for complete search history.

(56) References Cited

U.S. PATENT DOCUMENTS

| 5,410,640 | A |   | 4/1995  | Morikawa et al.  |          |
|-----------|---|---|---------|------------------|----------|
| 5,528,742 | A | * | 6/1996  | Moore et al.     | 715/542  |
| 5,680,615 | A |   | 10/1997 | Marlin et al.    |          |
| 5,699,524 | A | * | 12/1997 | Ooishi et al.    | 709/246  |
| 5,727,220 | A |   | 3/1998  | Hohensee et al.  |          |
| 5,768,488 | A |   | 6/1998  | Stone et al.     |          |
| 5,812,743 | A | * | 9/1998  | Takahashi        | 358/1.11 |
| 5,983,247 | A | * | 11/1999 | Yamanaka et al.  | 715/526  |
| 6,043,826 | A | * | 3/2000  | Manning          | 345/467  |
| 6,232,987 | B1| * | 5/2001  | Choi et al.      | 345/467  |
| 6,331,895 | B1| * | 12/2001 | Erickson et al.  | 358/1.13 |
| 6,633,292 | B2| * | 10/2003 | Nakatsuji et al. | 345/467  |
| 6,675,357 | B1| * | 1/2004  | Carter et al.    | 715/542  |
| 6,701,524 | B1| * | 3/2004  | Okamura et al.   | 725/37   |
| 6,788,428 | B1| * | 9/2004  | Shimokawa        | 358/1.15 |
| 6,954,898 | B1| * | 10/2005 | Nakai et al.     | 715/542  |
| 7,064,757 | B1| * | 6/2006  | Opstad et al.    | 345/467  |
| 7,197,706 | B1| * | 3/2007  | Berson et al.    | 715/542  |
| 7,197,707 | B2| * | 3/2007  | Cicchitelli et al.| 715/542 |
| 2001/0043214 | A1 | * | 11/2001 | Nakatsuji et al.| 345/471 |
| 2001/0052901 | A1 | * | 12/2001 | Kawabata et al. | 345/467 |
| 2002/0010725 | A1 | * | 1/2002  | Mo              | 707/530 |
| 2002/0089503 | A1 | * | 7/2002  | Shimamura       | 345/467 |

(Continued)

OTHER PUBLICATIONS

Lee et al., An Adaptive Viewing Application for the Web on Personal Digital Assistants, ACM 2003, pp. 125-132.*

(Continued)

*Primary Examiner*—Cong-Lac Huynh
(74) *Attorney, Agent, or Firm*—Schiff Hardin LLP

(57) ABSTRACT

In a method, a document output system, and a computer program for preparation of a resource-based document data stream for output on an output device, the document data stream is transferred from a first computer to a second computer. The document data stream comprises document data that are associated with an output font. In the course of the document data stream preparation, the output font is converted into a target font, and the conversion is controlled by at least one font conversion table that is stored in a resource file.

4 Claims, 3 Drawing Sheets

U.S. PATENT DOCUMENTS

| | | | | |
|---|---|---|---|---|
| 2002/0181988 | A1* | 12/2002 | Ohtsuji et al. | 400/76 |
| 2003/0131321 | A1* | 7/2003 | Teshima | 715/542 |
| 2003/0226118 | A1* | 12/2003 | Lee | 715/542 |
| 2004/0002385 | A1* | 1/2004 | Nguyen | 463/42 |
| 2004/0036694 | A1* | 2/2004 | Hirtenreiter | 345/601 |
| 2004/0051893 | A1* | 3/2004 | Yoshida | 358/1.11 |
| 2004/0076400 | A1* | 4/2004 | Kawate et al. | 386/52 |
| 2004/0081434 | A1* | 4/2004 | Jung et al. | 386/95 |
| 2004/0086156 | A1* | 5/2004 | Furukawa et al. | 382/112 |
| 2004/0088657 | A1* | 5/2004 | Brown et al. | 715/542 |
| 2004/0156075 | A1* | 8/2004 | Hohensee et al. | 358/1.15 |
| 2004/0184074 | A2* | 9/2004 | Leiman et al. | 358/1.15 |
| 2004/0205677 | A1* | 10/2004 | Hughes et al. | 715/542 |
| 2005/0086599 | A1* | 4/2005 | Koechley et al. | 715/542 |
| 2005/0193337 | A1* | 9/2005 | Noguchi et al. | 715/542 |
| 2007/0016874 | A1* | 1/2007 | Chaudhri | 715/787 |
| 2008/0022128 | A1* | 1/2008 | Proudler et al. | 713/189 |

OTHER PUBLICATIONS

Wright, Requirements and Design Goals for an Internet Printing Protocol, ACM Dec. 1998, pp. 172-179.*

Hardy et al., Mapping and Dislaying Structural Transformations between XML and PDF, ACM 2002, pp. 95-102.*

Advanced Function Presentation—Programming Guide and Line Data Reference, Oct. 2000.

IBM Data Stream and Object Architectures—Mixed Object Document Content Architecture Reference—SC31-6802-05, Apr. 2001.

Das Druckerbuch Chapter 11/12 Oce Printing Systems GmbH—Goldmann—Oct. 1999 Translation Attached.

Print Services Facility for OS/390 & z/OS—Customization—Version 3, Release 3.0—Mar. 2002.

IBM Advanced Function Presentation Programming Guide and Line Data Reference—Oct. 2000.

IBM Page Printer Formatting Aid: User's Guide—May 2002.

* cited by examiner

METHOD, COMPUTER PROGRAM PRODUCT AND DEVICE TO PROCESS A DOCUMENT DATA STREAM

BACKGROUND OF THE INVENTION

The invention concerns a method and a system to process document data streams. An AFP print data stream is prepared for output to a print device. Such a preparation typically occurs in computers that printer-adaptively process print files or print data from user programs. The document data or print data are converted into an output stream of a specific print data language such as, for example, AFP® (Advanced Function Presentation), Printer Command Language (PCL™) or Post Script™.

In large-scale computer centers, the print data is typically compiled or collated (spooling event) in a host computer (main frame), and from this print tasks (jobs) are generated that are adapted for output on high-capacity printing systems, such that the high-capacity printing systems can be temporally, optimally used at capacity in the production operation. They can thus largely be used in continuous operation.

Such high-capacity printing systems, with print speeds of approximately 40 DIN A 4 pages per minute up to over 1000 DIN A 4 pages per minute, are, for example, specified in the publication "Das Druckerbuch", published by Dr. Gerd Goldmann (Oce Printing Systems GmbH), edition 4C, October 1999, ISBN 3-000-00 1019-X. In chapter 12 (pages 12-1 through 12-18) of this publication, the print server system known under the same PRISMA PRO® is specified which serves in production printing environments to prepare print data streams.

A typical print data format in electronic production printing environments is the format AFP (Advanced Function Presentation), which, for example, is specified in the publication Nr. F-544-3884-02 by the company International Business Machines Corp. (IBM) with the title "AFP Programming Guide and Line Data Reference". In this publication, the specification for a further data stream with the designation "S/370 Line-Mode Data" is also specified. The print data stream AFP was further developed into the print data stream MO:DCA, which is specified in the IBM publication SC31-6802-04 with the title "Mixed Object Document Content Architecture Reference", and that likewise is designated as an AFP data stream. What are known as object containers (that are designated as MO:DCA objects), which comprise object data, are provided in the AFP specification. The object data can thereby be arbitrary data that does not have to correspond to the AFP specification. Further details of Objects Containers are specified in the publication SC31-6802-05, on the pages 93 through 95. Further details of this data stream, in particular the use of structured fields, are specified in U.S. Pat. No. 5,768,488.

Methods and systems are specified in U.S. Pat. No. 5,727,220 and U.S. Pat. No. 5,680,615, in which objects of a document belonging together are processed via a structured data stream such as MO:DCA or IPDS.

The contents of the publications and patent applications cited above are hereby included by reference in the present specification.

In the output of print data in high-speed print applications (which, for example, are applied in computer centers or also in print centers for what is known as PoD (Printing on Demand)), the print data are specially prepared so that they can be processed as quickly as possible in the print production environment and ultimately can be transfer printed on the recording medium. The data preparation thereby occurs primarily with regard to the print outputs meeting specific presentation requirements of the end customer (reader of the printed information).

In the preparation of document data streams for output on an output device, whereby the document data stream is transferred from a first computer to a second computer, and the document data stream comprises document data with which a font is associated, it is sometimes necessary to replace a font that is set in the document data stream with another font. This is in particular true for document data streams that operate with what are known as resources, whereby corollary or secondary document data such as fonts, forms and the like are stored in the resources. Some reasons why a conversion of font information is necessary are the various font technologies that are available (raster fonts or vector fonts) on output devices (such as printers), the various font collections that are available on output devices (for example, what are known as printer-resident fonts), various operating system environments (such as MVS, VSE, Linux, Windows, AS/400, and so forth), and copyright problems with specific fonts.

In various system environments that use the document data stream Advanced Function Presentation, a certain support for conversion of fonts is already offered today. In some products, the conversion algorithms are firmly anchored in the document processing software. In other products, external tables are available with which the user can control the conversion.

With the known methods and systems, the problem exists that, when a document data stream is given that requires a specific font conversion, and a complete collection of resources for this document processing job is available, the resource collection and the document output can be significantly different depending on which platform and with which application software the document processing job is processed.

The conversion of fonts is generally also then used by installations when standardized font collections are shared between a plurality of applications, systems and sites or locations. In this case, the font resources in all servers are available and are not sent together with the application as part of the inline resources when these move from a first environment to another environment. Instead of this, the applications are tied to a global resource identification (GRID) that is associated with each font. The GRID identification is used in order to search through conversion tables in order to find what are known as the "code page" and the character set that best matches the target output device.

In the processing of Advanced Function Presentation data streams, the risk exists that a document data stream that requires a character conversion produces different results depending on which environment is used to prepare the document data stream. This problem has already existed for years, however it became critical due to the increase in distributed printers, electronic archives and data stream converters.

SUMMARY OF THE INVENTION

It is an object of the invention to enable a preparation for output on an output device of a document data stream that comprises characters, such that an improved predictability of an output of the characters occurs on the output device.

In a system and method for preparation of a resource-based document data stream for output on an output device, a document data stream is provided comprising document data associated with an output font. The document data stream is transferred from the first computer to a second computer. In the course of the document data stream preparation, the output font is converted into a target font. The conversion is controlled by at least one font conversion table stored in a resource file.

DESCRIPTION OF THE PREFERRED EMBODIMENT

Figure 1:
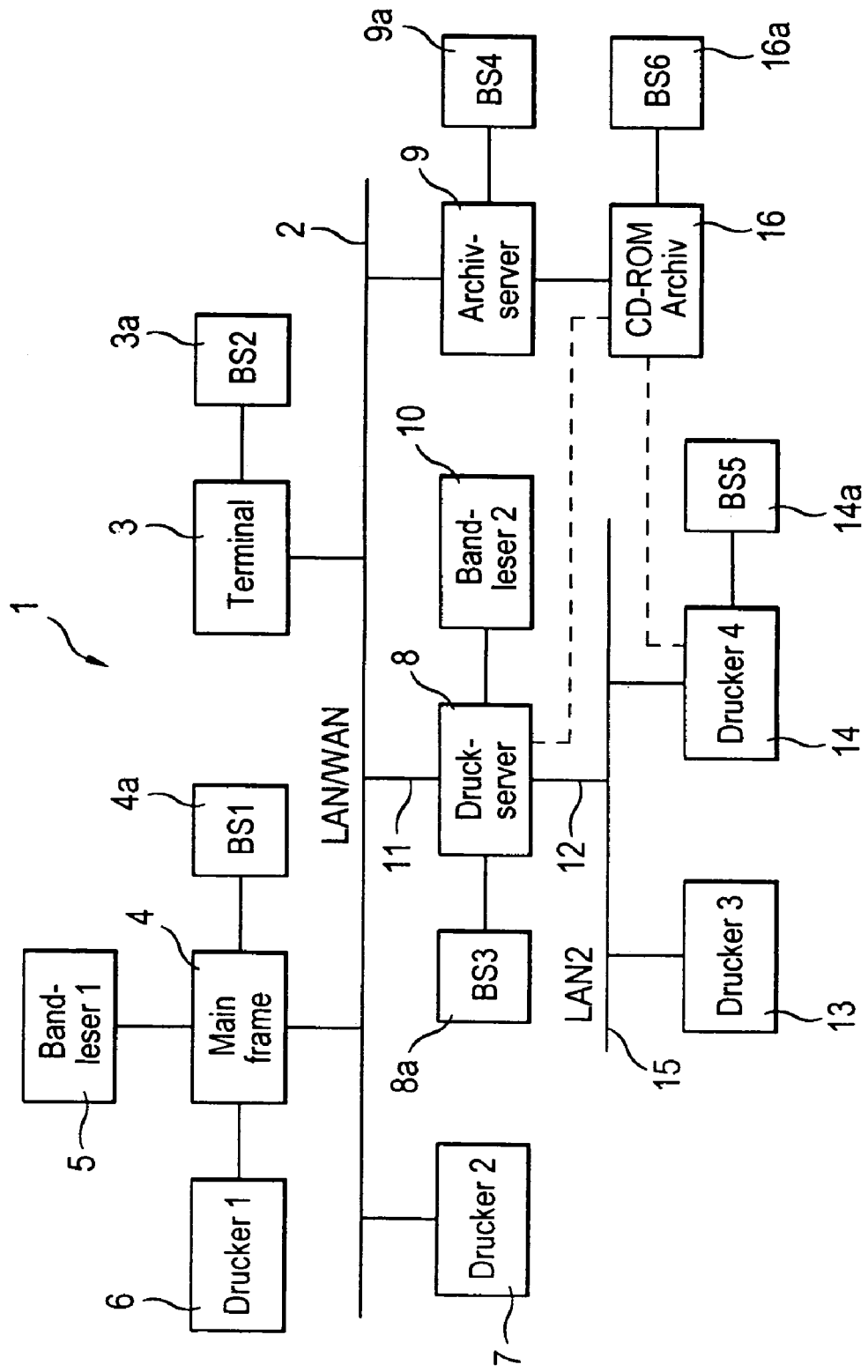
FIG. 1 illustrates a print production system.

For the purposes of promoting an understanding of the principles of the invention, reference will now be made to a preferred embodiment illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates.

For preparation of the document data stream for output on the output device, the document data stream is transferred from a first computer to a second computer. The document data stream comprises document data associated with an output font, and the output font is converted into a desired or target font in the course of the document data stream preparation. The conversion is thereby controlled by at least one font-conversion table that is stored in a resource file.

The embodiment is based on the thought that a way is specified to specify all character-conversion requirements of a document data processing application in such a manner that they are linked as closely as possible to the document data stream, in contrast to earlier known methods in which font-conversion tables were only linked on the side of the output environment (such as output computer programs, archiving systems and/or print systems).

According to the advantageous exemplary embodiment in which the document data stream is an Advanced Function Presentation data stream, a new type of AFP object container is defined. The character-conversion table can thereby also be designated as a "font mapping table", and the corresponding AFP object container can thereby receive a corresponding designation of "font mapping table object container". Such an AFP object container can be introduced without anything further into an AFP document data stream, because its structure and external form correspond to the AFP specification, and the content lying between the AFP-specified parts is freely configurable. The object containers within the AFP document data stream are treated as resources and can be packed, distributed, and archived together with the document data and the other necessary resources (fonts, forms, pagedef and so forth). Each computer program and each computer system for preparation of an AFP document data stream can use this new container type in order to obtain all character-conversion information that is required by the respective application.

In the exemplary embodiment, the resource file is transferred from the first computer to the second computer together with the document data stream, in particular as an inline resource of an Advanced Function Presentation data stream. Since the character-conversion table is stored in the file transferred with the document data stream, and thus is transferred between computers in direct association together with the associated document data stream, at any point in time at which the document data stream should be output on an output device, the exact character-conversion table associated with the document data stream is available. An approximately identical output of the document data can thus occur, largely independent of the respective computer system and/or of the output system.

Via the preferred embodiment, it is no longer necessary to implement character conversion synchronization between various user programs, systems or sites. Furthermore, with the preferred embodiment the advantage can be achieved that character-conversion specifications can be transported from one environment to another, in that simply the associated font mapping table object container is transferred.

When the AFP font mapping table object container is archived together with the corresponding application, then a backwards-compatibility of the document data is guaranteed, meaning document data streams displayed/printed later are reproduced exactly like the originally displayed/printed documents. Furthermore, with the preferred embodiment the advantage is achieved that various character-conversion algorithms can coexist within an environment because they are henceforth application-specific, meaning they are firmly connected with the print data stream and are not system-specific or site-specific.

Furthermore, existing AFP applications do not have to be changed in order to use them according to the preferred embodiment, because the selection of the font mapping table object containers can occur by a print job control system or by means of a print job corollary file (job ticket file). Furthermore, predefined font mapping table object containers can be prepared in order to emulate the character-conversion algorithms of specific, known application programs.

Furthermore, rastered or scanned document data can be generated in a rastering or scanning process character-by-character and pixel-by-pixel using the target font and the document data. In particular, in the rastering process raster matrices can be used in which the dot patterns of the associated characters are stored. However, document data can also be generated pixel-by-pixel in a vector allocation process using the target font and the document data.

A high-capacity print system 1 is shown in FIG. 1, in which various different system components are connected via a data network 2, which can be a local network (Local Area Network, LAN) or also a larger network (Wide Area Network, WAN). At least one client terminal 3, on which print jobs can be generated, is attached to the network 2. The terminal 3 is a known computer (for example personal computer PC) with connected monitor 3a.

The print jobs can optionally also be generated on a main computer (main frame) 4, or at least data can be inserted into the print job by the main frame 4. The main frame 4 of the computer center is controlled via a suitable operating system control such as MVS, BS2000 or VSE. On the main frame 4, control functions and displays via the monitor 4a connected thereto can ensue. Additionally, a tape reader device 5 as well as a first high-capacity printer 6 are directly connected to the main computer 4 (main frame).

Additionally, a second printer 7, a print server 8 as well as an archive server 9 are connected to the data network 2. The print server 8 in turn is connected with a second tape reader device 10 as well as a monitor 8a. In addition to the connection 11 between the print server 8 and the main data network 2, the print server is connected via the connection 12 with a second local network 15, to which further printers 13, 14 are connected. The print server 8 as well as the printer 14 can optionally be connected with a system for production of archive storage (CD-ROM) 16. However, the archive system 16 is mainly attached to the archive server 9. Additional monitors 9a, 16a and 14a are connected with the respective devices 9, 16 and 14.

Figure 2:
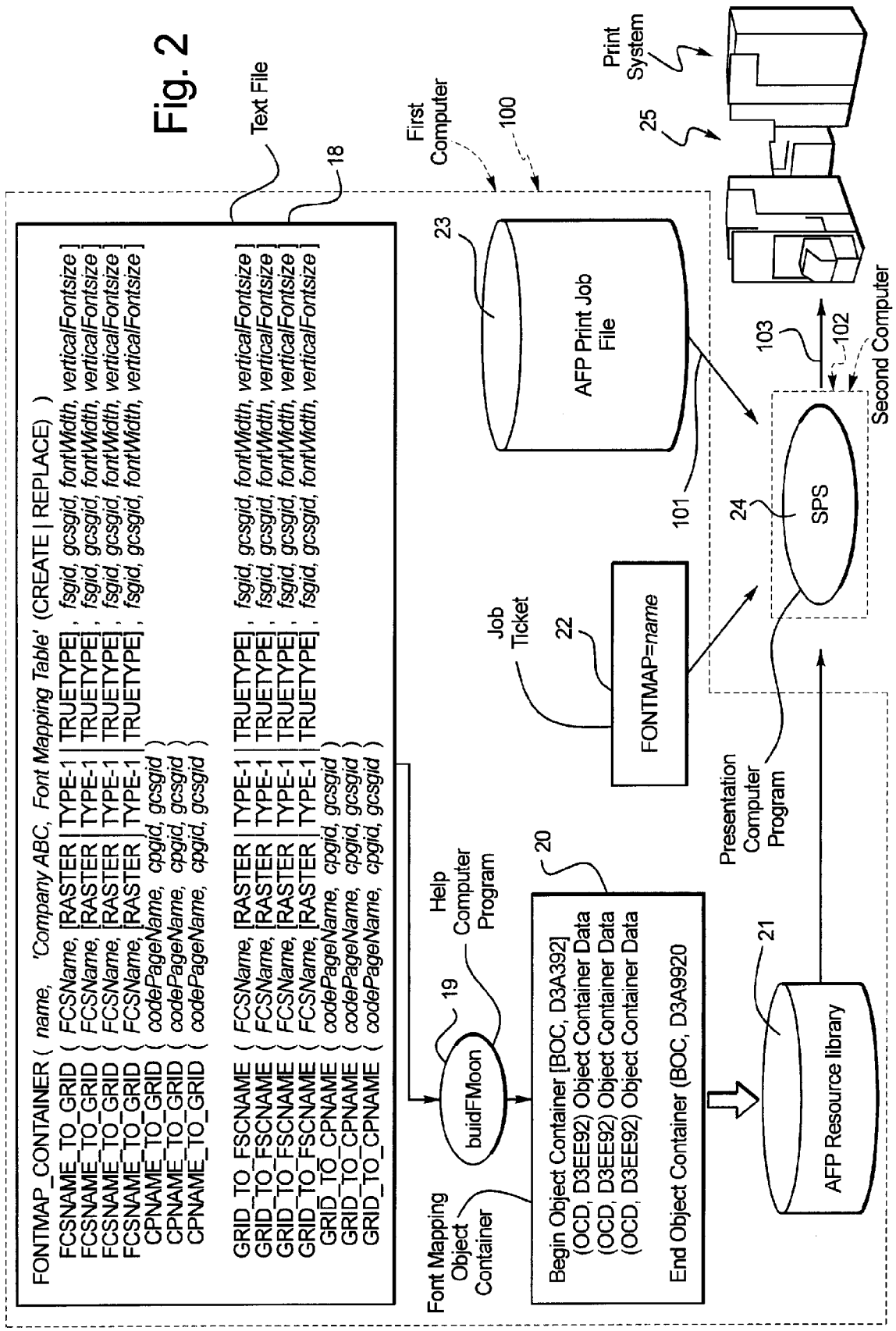
FIG. 2 shows a flow chart for generation and use of a font mapping table object container.

FIG. 2 shows a method procedure with which a first computer 100 having an AFP print job file 23 generates an AFP document data stream 101 which is used together with a font mapping table object container 20. This document data stream 101 is sent to a second computer 102 having a print system 25 associated therewith. A user creates a text file 18 in which the special instructions for conversion of characters (for the font mapping) by an installation and/or an application are defined. A simple help computer program (buildFMcom) 19 is used for this in order to thereby generate a font conversion table (font mapping table) in the AFP object container format. The user can then optionally send the font mapping object container 20 to a system AFP resource library 21 that is available for all applications that require a character conversion, and/or he can place the font mapping container 20 in a specific user library, such that it is available for selected applications. The user then sets whether the name of the font mapping object container 20 exists as an installation-wide parameter (for example, by means of LI.iNi in an AFP environment) or is data stream-specific in a document data corollary file, in what is known as a job ticket 22.

In addition to the document data stream 101, the job ticket 22 and the system library 21 are also used to prepare a modified document data stream 103 by means of a presentation computer program 24 at the second computer 102. By means of the information for character conversion present in the job ticket 22, and the conversion tables or corresponding font mapping object containers 20 in the system library, the modified data stream 103 is prepared by the presentation computer program 24 for output on a print system 25.

Figure 3:
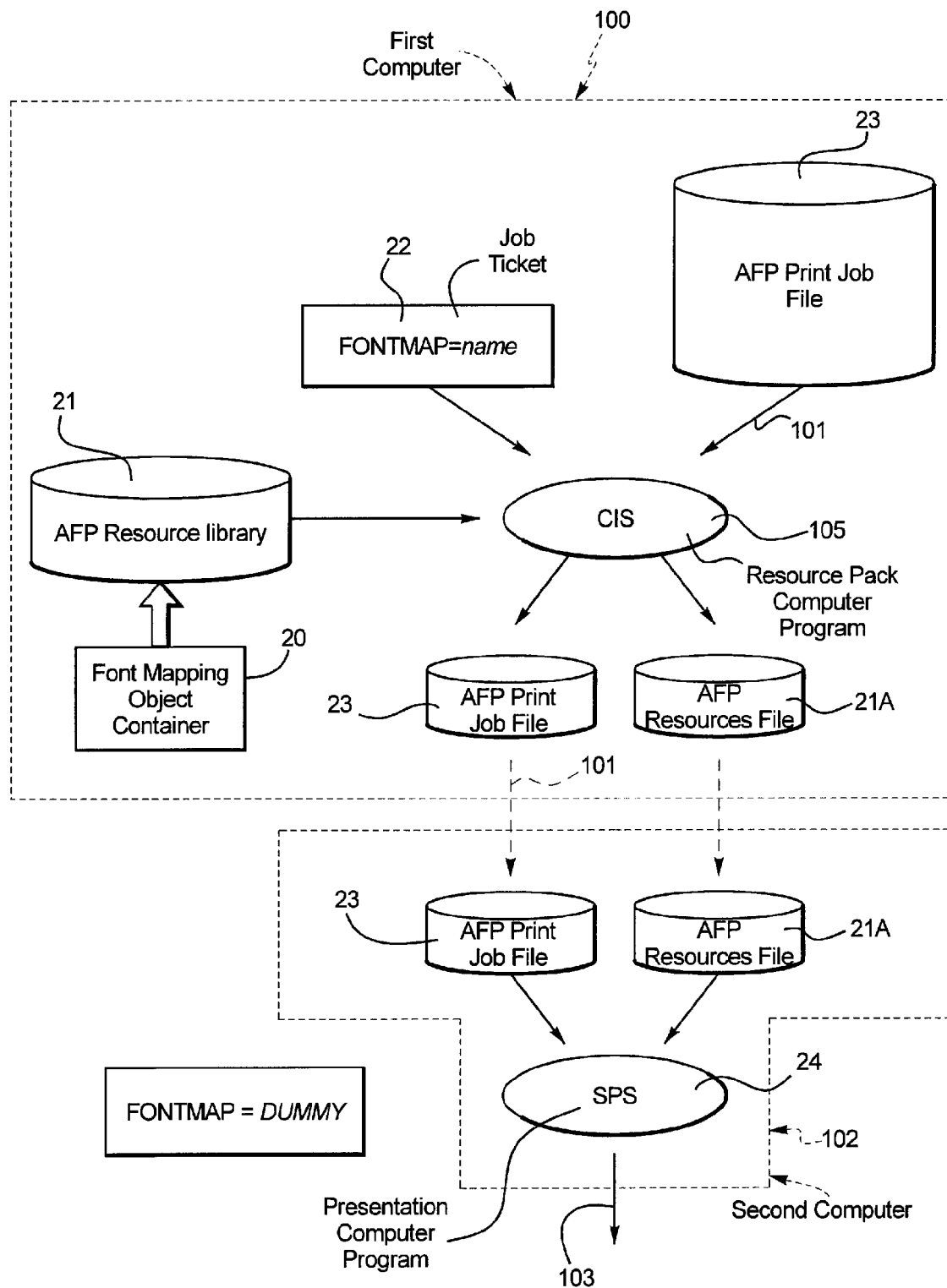
FIG. 3 is a flow chart for a largely automated processing of a document data stream with a mapping table object container.

In the method shown in FIG. 3, document data stream 101 of an application are sent from the AFP print job file 23 from a source server as first computer 100 to a target server for purposes of printing. Instead of ultimately outputting the job at modified document data stream 103 on a print system 25 such as shown in FIG. 2, it could also be output in an archiving system or be transferred to a different output device such as, for example, an e-mail system. The application uses the same font mapping object container 20 as the application shown in FIG. 2, whereby the font mapping object container 20 is stored in an AFP system library 21 (AFP resource library containing AFP resource file 21A).

Via the job ticket 22, or via a suitable other input or interface, the character-conversion table or the corresponding font mapping object container of the system library 21 (containing AFP resource file 21A) to be used for processing the document data stream is determined by its name. By means of a resource pack computer program 105 (CIS), all resources that are required for preparation of the modified document data stream 103 for the job are collected and copied together to an application-specific AFP resource file 21A. For this, the resource pack computer program can be set to the following two modes:

MODE 1. All character-calls (instruction in the AFP document data stream 101 calling a particular font) including the font mapping object container are passed through unchanged so that no character conversion is implemented by the resource pack computer program. This is the normal situation when installations use standard character collections. Mode 1 is shown in FIG. 3.

MODE 2. The character conversion is implemented and the corresponding replacement fonts or target fonts are compiled or assembled by the resource pack computer program. They are normally taken from the system library 21. Furthermore, after this character conversion the font mapping object container 20 (and thus also the corresponding AFP resource file 21A) is emptied, such that no further font conversions occur in later method steps, such as at the second computer 102.

The AFP document data stream 101 for AFP print job file 23 as well as the AFP resource file 21A, are then transferred from the first server (first computer 100) to the second server (second computer 102) together with the other resources (as the case may be, also with the target fonts to which they are mapped), and there are supplied to the presentation computer program 24 (SPS). The font mapping object container 20 is thereby provided in the AFP resource file 21A.

The presentation program 24 at the second computer 102 reads the document data stream and implements the following operations, depending on the content of the font mapping object container 20:

OPERATION 1. When the font mapping object container 20 comprises instructions for conversion of fonts, the presentation program implements these conversions or replacements. The corresponding target font data (font data) are thereby locally available, in particular via the AFP resource file 21A.

OPERATION 2. In the case that the font mapping object container 20 in the AFP resource file 21A (which was transferred from the first server (first computer 100) to the second server (second computer 102 together with the AFP document data 101) is empty, then the document data are processed such that no font conversion occurs by the presentation program even though a character conversion may have been implemented by the resource pack computer program in Mode 2.

Additional resource data or object containers can be specified without anything further that are used in connection with the font mapping object container.

The preferred embodiment is in particular suitable to be realized as a computer program (software). It can be disseminated as a computer program module as a file on a data medium such as a diskette or Control device-ROM, or as a file via a data or communication network. Comparable computer program products or computer program elements are also possible embodiments. The procedure can be applied in one or more computers, in a print device or in a print system with upstream or downstream data processing devices. In particular, a computer program, run alone on a computer or in cooperation with a second computer program running on a second computer, can effect a method embodiment procedure. It is thereby clear that corresponding computers on which the preferred embodiment is applied can comprise further known technical devices, such as input units (keyboard, mouse, touchscreen), a microprocessor, a data or control bus, a display device (monitor, display) as well as a working storage, a fixed disk storage, and a network card.

While a preferred embodiment have been illustrated and described in detail in the drawings and foregoing description, the same are to be considered as illustrative and not restrictive in character, it being understood that only the preferred embodiment has been shown and described and that all changes and modifications that come within the spirit of the invention both now or in the future are desired to be protected.

We claim as our invention:

1. A method for transmitting from a first computer to a second computer a resource file required for preparation of an advance function presentation (AFP) document data stream wherein said resource file is sent at the same time together with said AFP document data stream from said first computer to said second computer, comprising the steps of:

provided a text file with special instructions for conversion of characters for font mapping by use of a global resource identification (GRID), said text file providing a font mapping table for an AFP font mapping object container; and with a resource pack computer program selecting the font mapping object container to be used for processing the document data stream and sending the font mapping object container in an application-specific AFP resource file at the same time and together with the document data stream from the first computer to the second computer, said resource pack computer program being settable to first or second modes, wherein for the first mode the font mapping object container is passed through unchanged so that no character conversion is implemented by the resource pack computer program for a situation when output devices associated with the second computer use standard character font sets, or for the second mode a character conversion of the document data stream is implemented by the resource pack computer program and at least one corresponding replacement font is assembled and the font mapping object container is emptied after the character conversion.

2. A method of claim 1 wherein said global resource identification (GRID) is associated with each font and wherein said GRID is used at said second computer in order to search through conversion tables to find a code page and a character set that best matches a target output device associated with said second computer.

3. A method of claim 1 wherein at said second computer a presentation computer program is provided which reads the document data stream with the associated application specific AFP resource file and implements the following operations depending on a content of the font mapping object container:

if the font mapping object container in the AFP resource file comprises instructions for conversion of said at least one font, the presentation program implements the conversion; or if the font mapping object container in the AFP resource file is empty, then the document data are processed by the presentation program such that no font conversion occurs even though a character conversion may have been implemented by the resource pack computer program in the second mode.

4. A method of claim 1 wherein a transmission path between the first and the second computer is unidirectional from the first computer to the second computer.

\* \* \* \* \*